(12) United States Patent
Mazel et al.

(10) Patent No.: US 9,975,246 B2
(45) Date of Patent: May 22, 2018

(54) HUMANOID ROBOT PROVIDED WITH A MANAGER FOR THE PHYSICAL AND VIRTUAL RESOURCES THEREOF, AND METHODS FOR USE AND PROGRAMMING

(75) Inventors: Alexandre Mazel, Kremlin Bicetre (FR); David Houssin, Paris (FR); Jérôme Monceaux, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 11 days.

(21) Appl. No.: 13/994,751

(22) PCT Filed: Nov. 22, 2011

(86) PCT No.: PCT/EP2011/070684
§ 371 (c)(1),
(2), (4) Date: Aug. 1, 2013

(87) PCT Pub. No.: WO2012/079926
PCT Pub. Date: Jun. 21, 2012

(65) Prior Publication Data
US 2014/0316566 A1 Oct. 23, 2014

(30) Foreign Application Priority Data
Dec. 17, 2010 (FR) ...................................... 10 60755

(51) Int. Cl.
*B25J 9/16* (2006.01)
*B62D 57/032* (2006.01)
*G06N 3/00* (2006.01)

(52) U.S. Cl.
CPC .......... *B25J 9/1671* (2013.01); *B62D 57/032* (2013.01); *G06N 3/008* (2013.01); *Y10S 901/01* (2013.01)

(58) Field of Classification Search
CPC .................. G06F 21/554; G06N 3/008; G05B 2219/32239; G05B 2219/32328; B25J 9/1661
See application file for complete search history.

(56) References Cited

U.S. PATENT DOCUMENTS 6,975,970 B2 * 12/2005 Thorisson .......................... 703/1
8,452,448 B2 * 5/2013 Pack et al. ..................... 700/246
(Continued)

FOREIGN PATENT DOCUMENTS

EP 1486300 A1 6/2012
JP 2000-076088 A 3/2000
(Continued)

*Primary Examiner* — Ryan Rink
(74) *Attorney, Agent, or Firm* — Baker & Hostetler LLP

(57) ABSTRACT

A humanoid robot is provided with a manager for its physical and virtual resources, a method of use and a method for programming said manager. Said resources (140, 1410, 1420) are requested so as to execute behaviors. The resources and the behaviors are organized into hierarchical subsets, optionally defined in object trees. Conflicts of use of the resources by the behaviors are resolved locally, the behavior reserving resources being able to be programmed so as to offer options to the user of locking the resources by the reserving behavior, of release in favor of the first other requesting behavior, of partial execution of the behavior in progress or of pausing. A software toolkit makes it possible to program the Resource manager of the invention in a graphical manner in the development environment which allows the programming of the behaviors.

16 Claims, 13 Drawing Sheets

(56) References Cited

U.S. PATENT DOCUMENTS

| | | | |
|---|---|---|---|
| 8,571,745 B2* | 10/2013 | Pack et al. ................... | 701/27 |
| 2005/0240412 A1 | 10/2005 | Fujita | |
| 2008/0086241 A1* | 4/2008 | Phillips et al. .............. | 701/2 |
| 2010/0168911 A1* | 7/2010 | Jung et al. ................... | 700/245 |
| 2011/0029128 A1 | 2/2011 | Serre et al. | |
| 2012/0136481 A1 | 5/2012 | Maisonnier et al. | |

FOREIGN PATENT DOCUMENTS

| | | |
|---|---|---|
| JP | 2003-266352 A | 9/2003 |
| JP | 2004-298976 A | 10/2004 |
| JP | 2004-362425 A | 12/2004 |
| JP | 2005-144612 A | 6/2005 |
| WO | 2009124951 A1 | 10/2009 |
| WO | 2009124955 A2 | 10/2009 |
| WO | 2010136427 A1 | 12/2010 |
| WO | 2012025387 A1 | 3/2012 |

\* cited by examiner

```
----- root
------- State
--------- Stand Waiter:
--------- Sit (Activated) Waiter:
--------- Back Waiter:
------- Leds
--------- Left eye
--------- Right eye
--------- Left ear
--------- Right ear
--------- Chest
--------- Head
--------- Left foot
--------- Right foot
------- Audio
--------- TTS
--------- Microphone
------- All motors
--------- Head
----------- HeadYaw
----------- HeadPitch
--------- Arms
----------- Left arm
------------- LShoulderPitch
------------- LShoulderRoll
------------- LElbowRoll
------------- LElbowYaw
------------- LWristYaw
------------- LHand
----------- Right arm
------------- RShoulderPitch
------------- RShoulderRoll
------------- RElbowRoll
------------- RElbowYaw
------------- RWristYaw
------------- RHand
--------- Legs
----------- LHipYawPitch
----------- Left leg
------------- LHipRoll
------------- LHipPitch
------------- LKneePitch
------------- LAnklePitch
------------- LAnkleRoll
----------- Right leg
------------- RHipRoll
```

FIG.2b

```
----root
  |----State
  |    |----Stand Waiter:
  |    |----Sit (Activated) Waiter:
  |    |----Back Waiter:
  |----Leds
  |    |----Left eye
  |    |----Right eye
  |    |----Left ear
  |    |----Right ear
  |    |----Chest
  |    |----Head
  |    |----Left foot
  |    |----Right foot
  |----Audio
  |    |----TTS
  |    |----Microphone
  |----All motors
  |    |----Head
  |    |    |----HeadYaw ->ALFrameManager_0x947f000_root_MoveHead_1 eStrong ALFrameManager_0x947f000_root_MoveHead_2 1
  |    |    |----HeadPitch ->ALFrameManager_0x947f000_root_MoveHead_1 eStrong ALFrameManager_0x947f000_root_MoveHead_2 1
  |    |----Arms
  |         |----Left arm
  |              |----LShoulderPitch
  |              |----LShoulderRoll
  |              |----LElbowRoll
  |              |----LElbowYaw
  |              |----LWristYaw
  |              |----LHand
```

FIG.3a

```
---------Right foot
-------Audio
---------TTS
---------Microphone
--------All motors
---------Head
----------HeadYaw
----------HeadPitch
---------Arms
-----------Left arm
-------------LShoulderPitch
-------------LShoulderRoll
-------------LElbowRoll
-------------LElbowYaw
-------------LWristYaw
-------------LHand
-----------Right arm
-------------RShoulderPitch
-------------RShoulderRoll
-------------RElbowRoll
-------------RElbowYaw
-------------RWristYaw
-------------RHand
---------Legs
-------------LHipYawPitch ->ALFrameManager_0x9425af8_root_RobotModel_3eStrong0
-----------Left leg
---------------LHipRoll ->ALFrameManager_0x9425af8_root_RobotModel_3eStrong0
---------------LHipPitch ->ALFrameManager_0x9425af8_root_RobotModel_3eStrong0
---------------LKneePitch ->ALFrameManager_0x9425af8_root_RobotModel_3eStrong0
---------------LAnklePitch ->ALFrameManager_0x9425af8_root_RobotModel_3eStrong0
---------------LAnkleRoll ->ALFrameManager_0x9425af8_root_RobotModel_3eStrong0
-----------Right leg
---------------RHipRoll ->ALFrameManager_0x9425af8_root_RobotModel_3eStrong0
---------------RHipPitchl ->ALFrameManager_0x9425af8_root_RobotModel_3eStrong0
---------------RKneePitch ->ALFrameManager_0x9425af8_root_RobotModel_3eStrong0
---------------RAnklePitch ->ALFrameManager_0x9425af8_root_RobotModel_3eStrong0
---------------RAnkleRoll ->ALFrameManager_0x9425af8_root_RobotModel_3eStrong0
```

FIG.7c

HUMANOID ROBOT PROVIDED WITH A MANAGER FOR THE PHYSICAL AND VIRTUAL RESOURCES THEREOF, AND METHODS FOR USE AND PROGRAMMING

CROSS-REFERENCE TO RELATED APPLICATIONS

This application is a National Stage of International patent application PCT/EP2011/070684, filed on Nov 22, 2011, which claims priority to foreign French patent application No. FR 1060755, filed on Dec. 17, 2010, the disclosures of which are incorporated by reference in their entirety.

FIELD OF THE INVENTION

The present invention belongs to the field of humanoid robots. More precisely, it applies to the management of the resources of said robot, notably when several users of this robot independently program behaviors intended to be implemented by said robot.

BACKGROUND

A robot may be described as humanoid as long as it possesses certain attributes of the appearance and functionalities of man: a head, a trunk, two arms, two hands, two legs, two feet etc. Beyond appearance, the functions that a humanoid robot is capable of fulfilling will depend on its capacity to perform movements, to speak and to "reason". Humanoid robots are capable of walking, of making gestures, with the limbs or with the head. The complexity of the gestures that they are capable of performing is continually increasing. Gestures coordinated with one another or coordinated with speech (for example a raised arm, threatening words spoken in a raucous tone), signals emitted by parts of the robot (notably its LEDs), can be the expression of the robot's behaviors which convey its "emotions" (for example, anger). Certain robots, notably the NAO robot, which is the platform on which the concepts and the means for implementing the present invention have been developed, offer several users the possibility of developing behaviors independently of one another. These possibilities are greatly improved with development tools employing user language, such as the Chorégraphe software. Consequently, the problem arises of knowing how to ensure the coherence of the various behaviors, programmed by different users, at the time of their execution, notably so as to avoid conflicts in the use of the hardware and software resources of the robot or robots, to ensure the synchronization of the availability of the resources which must be used concomitantly and to manage the priorities of execution of a certain number of functions.

It is traditional in robotics to ensure protection of the motors and to prohibit their simultaneous use by several behaviors; this is a first type of solution to this general problem of the management of resources, but it is not a general solution: in particular, this type of solution does not afford any response to the problem posed by the synchronization of different resources, nor to the problem of the freeing of the resources.

To solve these problems of the allocation of resources over time in other fields of technology, it is traditional to implement optimization mechanisms in the allocation of resources, notably using algorithms of the constraint-based logic programming type. These algorithms are, however, suited to the computations of the allocation of resources which are not consumed immediately since they are greedy in terms of computational resources. In particular, they could be used on a humanoid robot provided with multiple behaviors only for a very small proportion of the latter.

There does not therefore exist in the prior art any solution making it possible to solve the problem of the allocation of hardware or software resources, or those of other types, to independent processes. The present invention solves this problem by affording a hierarchical definition of resources, coupled with a local or decentralized resolution mechanism.

SUMMARY OF THE INVENTION

For this purpose, the present invention discloses a humanoid robot able to execute a plurality of behaviors under the control of an onboard management module comprising a sub-module for managing a plurality of resources which can be assigned to the execution of said behaviors, wherein said plurality of behaviors and said plurality of resources are each organized into hierarchical subsets, and said sub-module for managing the resources is programmable to reserve at least one resource in at least one subset of resources for the execution of at least one behavior in at least one subset of behaviors, said reservation being programmable to be inherited by said subset of behaviors and/or to be applied to said subset of resources.

Advantageously, said sub-module for managing the plurality of resources is programmed to respond, when a first behavior is being executed, to a resource request by a second behavior with at least one of the following actions: refusing to make said resource available to said second behavior, immediately making available of said resource to said second behavior, executing at least one additional action and subsequently making available said resource to said second behavior, pausing of the first behavior being executed and subsequently making available of said resource to said second behavior.

Advantageously, said sub-module for managing the plurality of resources is programmed to, when the action of refusal to make available said resource requested by said second behavior is executed, said second behavior again executes a request to make available according to a predefined frequency until expiry of a likewise predefined expiry period.

Advantageously, said sub-module for managing the plurality of resources is programmed so that, when at least two behaviors execute a request to make one and the same resource available, the first of the at least two behaviors has priority in the reservation of said same resource when the latter is released.

Advantageously, said sub-module for managing the plurality of resources is programmed so that, when at least one behavior executes a request to make at least two resources available, said at least two resources are grouped into a new resource treated as a single resource, said grouping being ordered in a unique manner for all the behaviors executing identical resources requests.

Advantageously, said sub-module for managing the plurality of resources is programmed so that, when a parent behavior reserves at least one resource without using it, said at least one resource can be used by a child behavior of said parent behavior.

Advantageously, said sub-module for managing the plurality of resources is programmed so that, when a first child behavior uses a resource reserved by said parent behavior, a second child behavior of the same parent must, so as to be able to use said resource, perform a request to make said resource available with the first child behavior.

Advantageously, said sub-module for managing the plurality of resources is programmed so that, when a parent behavior releases a resource of which it has previously reserved, said resource must be released by any child behavior of said parent.

Advantageously, said sub-module for managing the plurality of resources is programmed so as, when a subset of resources has reduced availability, to carry out a reservation of said resources for a virtual behavior defined as a function of said reduction in availability.

Advantageously, said sub-module for managing the plurality of resources is programmed so as to release said reservation as a function of the evolution of the state of said reduction in availability.

Advantageously, the plurality of resources comprises at least one state variable, said at least one variable having to be in a predefined state so as to be reserved, said reservation being necessary for the execution of at least one behavior.

Advantageously, the plurality of resources comprises at least one accumulative resource and in that a rate of use of the latter is assigned to the behaviors programmed so as to use said at least one resource.

Advantageously, the plurality of resources comprises at least one essential resource and one non-essential resource, any behavior having to call upon the at least one essential resource being unable to execute if said essential resource is not available and being able to execute if it must call upon said at least one non-essential resource, even if the latter is not available.

The invention also discloses a method for managing the resources of a humanoid robot able to execute a plurality of behaviors under the control of an onboard management module, said method comprising a step of reservation of a plurality of resources which can be assigned to the execution of said behaviors, wherein said plurality of behaviors and said plurality of resources are each organized into hierarchical subsets, and said reservation step assigns at least one resource in at least one subset of resources to the execution of at least one behavior in at least one subset of behaviors, said reservation being programmable to be inherited by said subset of behaviors and/or to be applied to said subset of resources.

The invention also discloses a computer program comprising program code instructions allowing the execution of a method for managing the resources of a humanoid robot able to execute a plurality of behaviors under the control of an onboard management subroutine, said subroutine comprising a module configured to execute a function for a reservation of a plurality of resources which can be assigned to the execution of said behaviors, wherein said plurality of behaviors and said plurality of resources are each organized into hierarchical subsets and said reservation function assigns at least one resource belonging to at least one subset of resources to the execution of at least one behavior in at least one subset of behaviors, said reservation being programmable to be inherited by said subset of behaviors and/or to be applied to said subset of resources.

Advantageously, said subsets of behaviors and of resources are defined as classes of objects.

The invention also discloses a method for developing a module for managing the resources of a humanoid robot and a computer program for implementing said method.

The invention furthermore offers the advantage of avoiding the lockup situations which are frequent in computer systems with processes executing in parallel on one and the same processor. It also makes it possible to manage very different types of resources, including virtual resources corresponding to states, the freezing of which makes it possible to avoid the launching of behaviors which would be liable to create a situation of lockup or danger for the robot.

BRIEF DESCRIPTION OF THE DRAWINGS

The invention will be better understood and its various characteristics and advantages will emerge from the description which follows of several exemplary embodiments and its appended figures wherein:

FIGS. 2a and 2b are screen views of a computer program allowing the implementation of the invention in several of its embodiments;

FIGS. 3a and 3b represent resource management schemes, respectively in the form of a list of available resources and in the form of graphical programming based on boxes, in several embodiments of the invention;

FIGS. 7a, 7b and 7c illustrate the problematic issue of the management of the absent resources, respectively by representing a complete robot, a trunk robot and a list of available/unavailable resources, in several embodiments of the invention;

DETAILED DESCRIPTION

Figure 1:
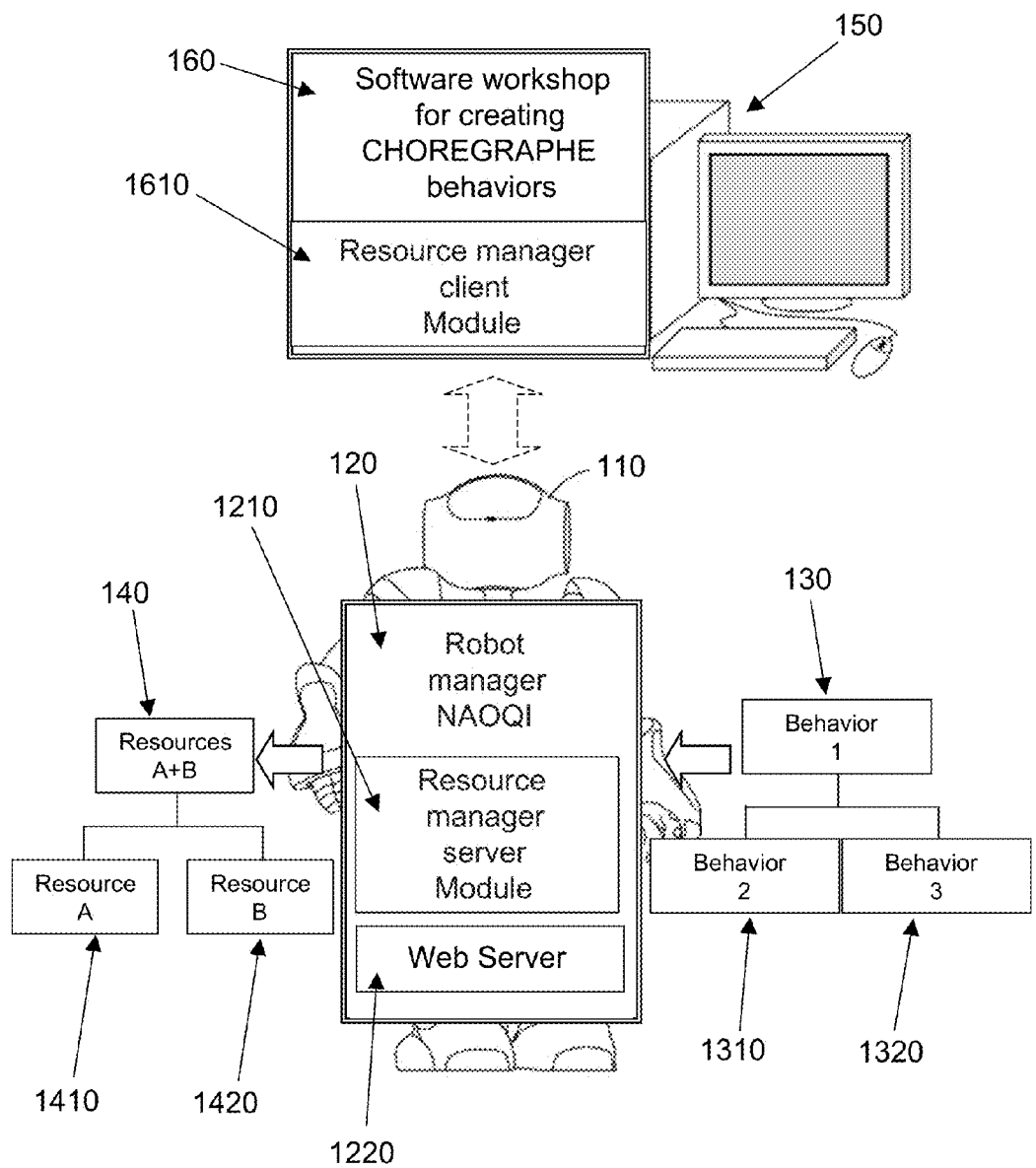
FIG. 1 is a diagram of the functional architecture according to which the invention is implemented in several of its embodiments.

FIG. 1 is a diagram of the functional architecture according to which the invention is implemented in several of its embodiments.

The underlying physical architecture consists of a humanoid robot 110, an exemplary embodiment of which is given hereinbelow and, optionally, of a remote work station 150 equipped with a software workshop for creating behaviors 160.

A humanoid robot with trademark NAO™ is known. Such a robot has been disclosed notably in patent application WO2009/124951 published on 15 Oct. 2009. This platform has served as the basis for the improvements which have led to the present invention. In the subsequent description, this humanoid robot may be designated either by this generic term or by its trademark NAO™, without the generality of the reference being modified thereby. This robot comprises about two dozen electronic cards for controlling sensors and actuators which drive the articulations. An articulation normally has at least two degrees of freedom and therefore two motors. Each motor is driven in terms of angle. The articulation also comprises several position sensors, notably MREs (Magnetic Rotary Encoder). The electronic control card comprises an off-the-shelf microcontroller. This can be for example a DSPIC™ from the company Microchip. This is a 16-bit MCU coupled to a DSP. This MCU has a looped slaving cycle of one ms. The robot can also comprise other types of actuators, notably LEDs (Light-Emitting Diodes) whose color and intensity can convey the emotions of the robot. The latter can also comprise other types of position sensors, notably an inertial unit, FSRs (Ground pressure sensors).

The head comprises the intelligence of the robot, notably the card which executes the high-level functions which allow the robot to accomplish the missions which are assigned to it. The processor of the card can be an off-the-shelf x86 processor. A low-consumption processor such as the Geode™ from the company AMD (32 bits, 500 MHz) will be chosen in a preferred manner. The card also comprises a set of RAM and flash memories. This card also manages the communications of the robot with the outside (server of behaviors, other robots, etc.), normally on a WiFi, WiMax transmission layer, optionally on a public network for mobile communications of data with standard protocols optionally encapsulated in a VPN. The processor is normally driven by a standard OS thereby making it possible to use the usual high-level languages (C, C++, Python, etc.) or the specific languages for artificial intelligence such as URBI (specialized programming language for robotics) for programming the high-level functions.

Another card is housed in the trunk of the robot. This is where the computer which ensures the transmission to the articulation control cards of the orders computed by the card of the head is situated. The computer of this card is also an off-the-shelf processor. This can advantageously be a 32-bit processor of the type ARM 9™ clocked at 100 MHz. The type of the processor, its central position, close to the on/off button, its link to the control of the power supply make it a very suitable tool for managing the robot's power supply (idle mode, emergency stop, etc.). The card also comprises a set of RAM and flash memories.

The intelligence of the robot is installed according to a specific software architecture, which constitutes a genuine operating and robot interface management system, 120, dubbed NAOQI. This architecture has been disclosed notably in patent application WO2009/124955 published on 15 Oct. 2009. The software modules making up this architecture comprise the system functions for managing the communications between a robot and a PC or a remote site and for exchanging software which provides the software infrastructure necessary for implementing the present invention. This architecture comprises the functions necessary for managing the basic functions of the robot, such as move, move a limb, interpret the signals of a sensor or dispatch signals via an actuator. It also allows a user of the robot to install, in the onboard memory of the latter, software programs for controlling the execution by the robot of behaviors 130, 1310, 1320, which may be gestures, including complex coordinated gestures such as dance steps, speech or emotions, these last generally being combinations of gestures, of speech and of emission of signals by actuators such as LEDs.

For the execution of these behaviors, the robot will have to call upon resources 140, 1410, 1420. The present invention pertains to the schemes for managing said resources to allow non-conflictual execution of the behaviors. It is implemented in essence in the module for managing the resources or "Resource manager server", 1210, the detailed operation of this module being described hereinafter in the present description.

It is possible to program the behaviors to be executed by the robot on a remote terminal such as the work station 150, by using any software whose target language shall be C, C++, Python or Urbi. However, to implement the present invention, a specific functional architecture for editing and programming the behaviors of a humanoid robot will advantageously be used. Such an architecture has been described by patent application PCT/EP2010/057111 filed on 25 May 2010. The software workshop for editing and programming the behaviors of a humanoid robot, 160, making it possible to implement said architecture has the trademark name Chorégraphe™, and can be designated either by its generic name or by its trade name, without impairing the generality of the references. This architecture is particularly effective for generating robot behaviors since it makes it possible to easily achieve articulation of the commands triggered by events with their temporal dimension. The commands triggered by events are represented in Chorégraphe by "Boxes" or "Control boxes". A Box is a tree-like programming structure which can comprise one or more of the elements hereinbelow which are defined thereafter:

A "Timeline" or temporal axis of Frames;
A "Diagram" or Flow chart;
A Script.

The Control boxes are normally linked together by connections which usually transmit an event information item from one Box to another. Any Box is linked directly or indirectly to a "Root box" or Root which initializes the behavior/movement scenario of the robot.

A temporal axis of Frames represents the temporal constraint to which the robot's behaviors and movements, defined in the Box in which said temporal Axis of Frames or Timeline is inserted, are subject. The Timeline thus carries out the synchronization of the behaviors and movements of the Box. It is split up into frames with which is associated a speed of progress defined as number of Frames per second or Frames Per Second (FPS). The FPS of each Timeline is parametrizable by the user. By default, the FPS can be fixed at a given value, for example 15 FPS.

A Timeline can comprise: i) one or more Behavior Layers, each comprising one or more Behavior Key Frames or "main behavior Frames", which can themselves comprise one or more Diagrams or "Flow charts", which are in fact sets of Boxes which can also be attached directly to a higher-level Box, without passing through a Behavior layer or a Timeline; ii) one or more motion Layers, each comprising one or more Motion Key Frames or "main motion Frames" which can comprise one or more Motion Screens.

A Flow chart is a set of Boxes connected together, as detailed further on. Each of the Boxes can in its turn comprise other Timelines to which new behavior or motion Layers are attached.

A Script is a program directly executable by the robot. Within the framework of the present invention, the Scripts are in a preferred manner written in the C++ language. A Box which comprises a Script does not comprise any another element.

The software can be installed on a PC or another platform of personal computer type using a Windows™, Mac™ or Linux™ operating system.

Within the framework of the present invention, specific Chorégraphe screens, that may be considered to be a Chorégraphe module dubbed the "Resource manager client", 1610 allows the programming of the rules for managing the resources of humanoid robots such as NAO by generating scripts which will be embedded aboard the Resource manager server module, 1210. The design of the Chorégraphe Boxes, which can be contained in one another, is particularly advantageous for the implementation of the present invention. Indeed, the behavior of higher level, 130, of FIG. 1, that can be described as parent behavior, may comprise for example two child behaviors, 1310, 1320, which it will be possible to code graphically (drag and drop of preprogrammed Boxes and of inter-connections) by Boxes which will be included in the Box of the parent behavior. The elementary resources 1410, 1420, which designate for example the left Leg resource and the right Leg resource, can be grouped into a lower Limbs single resource, 140. Left Leg and right Leg are themselves composite resources each comprising a thigh, a knee, a lower leg, an ankle, a foot, each of these subsets being able itself to comprise one or more motors, one or more sensors, one or more actuators. Chorégraphe manages by way of the Timeline the synchronization of the resources by assuming that those which the behaviors need will be available. Chorégraphe, without the Resource manager server of the present invention, does not manage the making available of the resources.

Conflicts regarding the making available of the low-level resources such as the motors can be resolved by conventional algorithms of the "mutual exclusion" or mutex type. Such algorithms have the common characteristic of excluding the seizure of a resource managed in this manner by two simultaneous processes. The algorithms of this type differ notably through the mechanisms for managing priorities and waits. However, such algorithms do not allow easy resolution of higher-level conflicts, when processes have to access composite resources. Moreover, a solution to this problem may not be envisaged through recourse to resource assignment optimization algorithms, having regard to the necessarily very short time constant of a robot's behaviors in order for it to have a human appearance, to the CPU consumption of said algorithms and to the feebleness of the computational resources embedded aboard the robot.

Another difficulty with the resources management problem solved within the framework of the present invention is that several users can program behaviors independently of one another and each install their behaviors on one and the same robot (on condition of course that they are entitled to do so).

As detailed throughout the description, the architecture of behaviors and of resources and the functions for managing the relations between these entities make it possible notably, within the framework of the present invention: to avoid resource conflicts (two behaviors cannot use the same motor at the same time, two behaviors which manipulate one and the same ball cannot execute at the same time); to synchronize the use of different resources (to say hello, an arm and the audio are used; these two resources must be available at the same time to obtain a coherent behavior); to manage the various robot models (for example, a robot with no arms, with legs, with wheels, etc.) and a robot having limbs that are faulty or are operating in degraded (energy saving) mode; to avoid deadlocks or situations of lockups regarding the allotting of resources in a multi-thread system (in which several processes execute in parallel); to have a conflict resolution mechanism; to ensure the availability of the resources for critical behaviors; to protect the robot whatever the behavior (not to fall for example).

The Resource manager server 1210 ensures the availability of the resources. It has a hierarchical data structure within the framework of an object development: a parent object or behavior can reserve resources, the child behaviors are then assured of obtaining the resources. It also makes it possible to resolve conflicts rapidly: The resolution is decentralized/local thereby making it possible to circumvent the mathematical and algorithmic complexity (computation time) of a constraints resolution engine. The one which generates the conflict resolves the conflict, the Resource manager client does not do any computation.

The Resource manager server comprises mechanisms making it possible to avoid lockups/deadlocks in a multi-thread system (for example, joint management of a group of resources—i.e. all the motors—as a single resource—i.e.: a motor. The system is also generic: in contradistinction to other systems in which the functionality and the resources are nested, the Resource manager can manage any type of resource and is not tied to a functionality. It is possible to compare the traditional approach with semaphores/mutexes which protect a precise item of data in a functionality without permitting an additional level of abstraction as is the case with the Resource manager of the present invention (synchronization of these various resources).

Figure 2A:
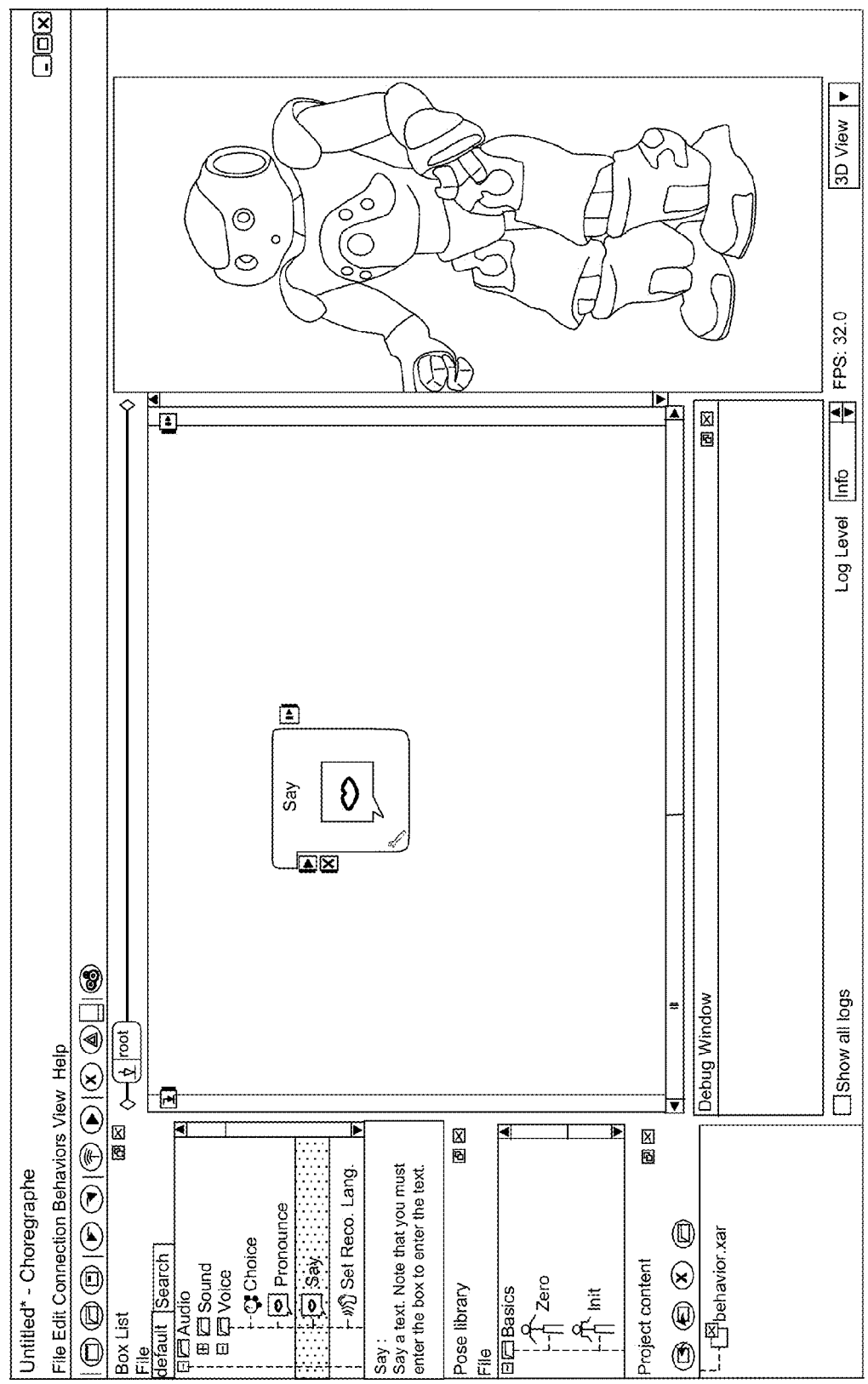

FIGS. 2*a* and 2*b* are screen views of a computer program allowing the implementation of the invention in several of its embodiments.

In FIG. 2*a* is represented a Chorégraphe screen. The Chorégraphe module 160 loads onto the robot the behaviors 130, 1310, 1320 as well as the resources 140, 1410, 1420 used by said behaviors, the rules for reserving said resources having been defined beforehand in the Resource manager client, 1610, according to schemes which will be detailed later in the description. A Resource manager server, 1210, is the opposite party on the robot corresponding to the Resource manager client.

When Chorégraphe refers to the resources, it requests them from the robot's server (or from a robot simulated on a PC). At each execution, the Chorégraphe code is transferred to the robot.

An initialization file represented in FIG. 2*b* lists the set of resources of the robot. The robot advantageously comprises a Web server, 1220, which, on request of the client, 1610, returns the list of resources to the station 150, said list being able to be viewed in the Resource manager client, 1610. Said list can be viewed by Chorégraphe (robot's client Chorégraphe) or a Web browser (robot's client Web page). It will be noted, however, that the invention can be implemented entirely without recourse to Chorégraphe, or to a Resource manager client module, 1610. In this case, the server station 150 dispatches behaviors to the robot, said behaviors being interpreted by the NAOQI module, 120, and procures the list of resources on the server, 1220, the hierarchization of the behaviors and the grouping together of resources being performed in the Resource manager server, 1210.

Thus, the Resource manager server, 1210, is a module of the robot, subset of NAOQI, which defines the set of resources available. A behavior contains actions (motion, audio, video). It is coded in C++ or Python, or carried out graphically (Python or C++ encapsulation). The robot's Web server can return in a browser the list of resources as well as the behaviors which use them and those which are waiting for the availability of a resource. The resources being hierarchical, the user can easily occupy the top, the bottom, a leg of the robot without knowing the details of the motors situated in each of these parts.

An API (Application Programming Interface) makes it possible to use the Resource manager 1210 in C++, in python (wrapped C++) or in the graphical language (encapsulation of C++ or of python) and to generate the following commands:

Seize or wait for a single resource, i.e.
void waitForResource (const string& resourceName, const string& ownerName, const string& callbackName, const int& timeoutSeconds);

Seize or wait for a single resource while giving hierarchical information between the behaviors (later in the description, the behaviors which reserve resources are called "Owners") i.e.
void waitForLocalResourcesTree (const vector<string>& resourceName, const class AL:ALPtr<class AL::ALHierarchyOwner>& treeOwnerPtr, const string& callbackName, const int& timeoutSeconds);

Release a resource, i.e.
void releaseResource (const string& resourceName, const string& ownerName).

Figure 3B:
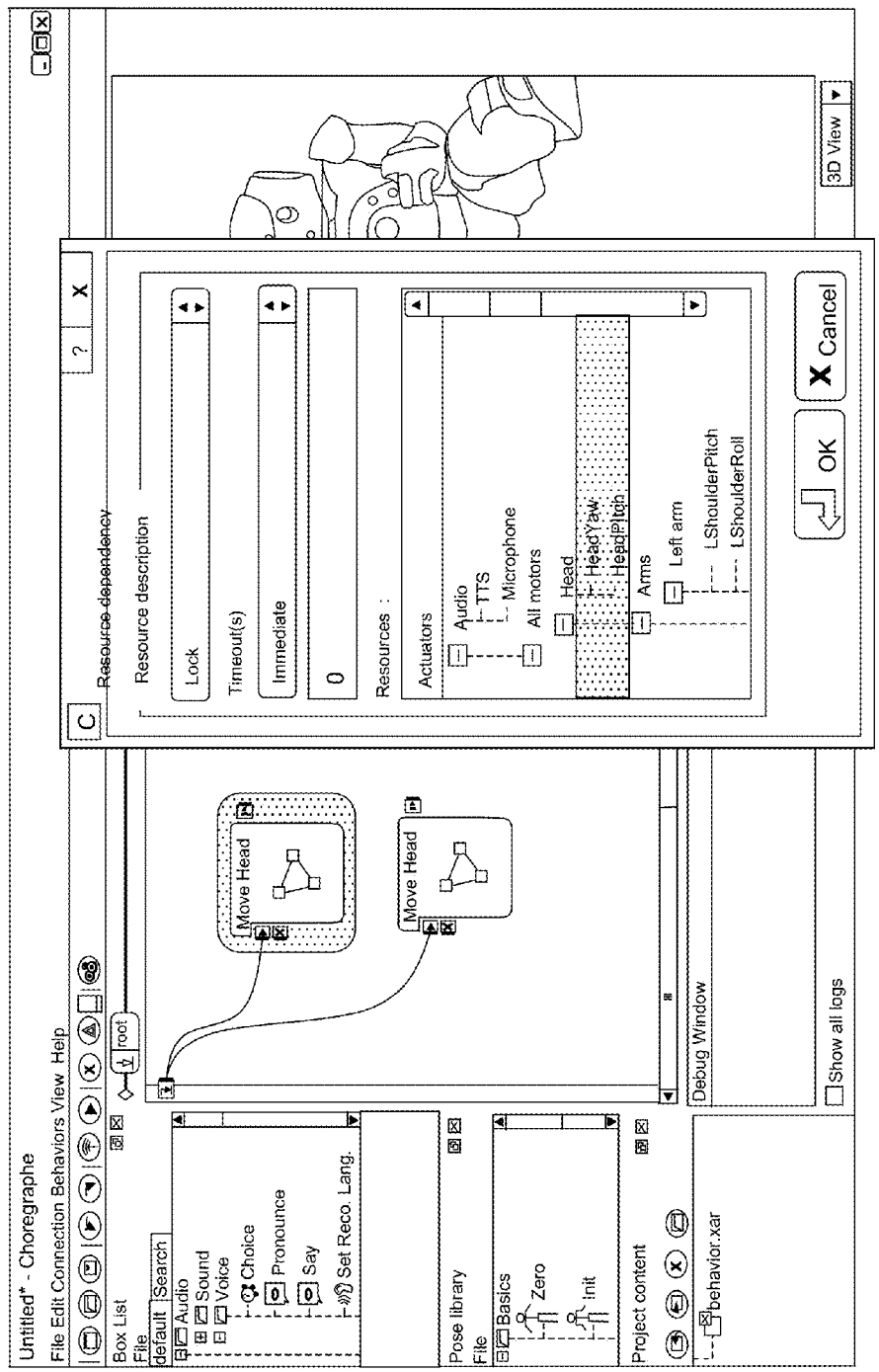

FIGS. 3*a* and 3*b* represent resource management schemes, respectively in the form of a list of available resources and in the form of graphical programming based on boxes, in several embodiments of the invention.

These figures illustrate the principle of the processing operations applied to the management of the conflicts on a single resource.

In the case of a single resource (a motor for example), this entails avoiding any deadlock. Only the list of resources is protected with the help of an algorithm of mutex type and this mutex is used in resource addition or deletion. The conflict itself (waiting for the freeing of a resource) is not protected while being thread-safe. The mutexes are a system for protection of the standard library in order to render an application thread-safe (accessible on a parallel system with several threads). On the other hand, they do not prevent deadlocks. We therefore use only the mutexes to protect the list of resources. The conflict resolution does not call upon the lockup system, namely the mutexes, but it is thread-safe however.

Conflict resolution in the reservation of resources is done by applying the following principles: i) in a multi-thread system, two Owners cannot seize the same resource at the same moment; we therefore protect the request with a try-lock which is a non-disabling attempt to acquire a resource locked by a mutex; ii) when two Owners request the same resource at exactly the same time (defined by the scheduler of the OS), all the Owners must resolve the conflict but only the first obtains the resource when it is free (first come, first served).

An example of this type is illustrated by the list of resources of FIG. 3*a* and the Boxes and the view of the screen for defining Chorégraphe dependency relations of FIG. 3*b*.

In this example MoveHead1 possesses the resource. MoveHead2 is waiting for the resource. A MoveHead3 would also wait for the resource but MoveHead2 would obtain it first (first come, first served).

The assignment of the resource is carried out by a smart-pointer (intelligent pointer comprising an encapsulated code executed on the resources pointed at, thereby avoiding the use of a mutex (the assignment must be atomic for the OS).

If two threads are executing A=B (or in the case of the application illustrated, OwnerResourceA=new_Owner), then the code line A=B must be protected by a mutex, otherwise the application is interrupted at the moment at which two threads execute it. Now, we do not want to use a mutex to resolve this conflict. However, in certain cases, A=B does not need to be protected, notably, if A and B are atomic types (of integer, float type, etc.) which can never cause an interruption of A=B by another thread (and cause the application to crash). This is why in OwnerResourceA=new_Owner, ownerResourceA and new_Owner are integers (pointers). Thus, in the absence of any mutex, our application cannot lock up (deadlock).

The algorithm is then of the type:
Waiting for Resource-head
Detection of simultaneous requests by a try-lock resolution of the conflict (wait or timeout) if I am the first incoming according to the try-lock:
point-to-my-old-owner=point-to-my-new-owner
otherwise further resolve the conflict.

In Chorégraphe, the MoveHead Boxes are used. The two head movements are parallel and each of them references the same motors. Here, the lock option signifies that the other requesters will be placed on standby awaiting the limit of their timeout.

Figure 4A:
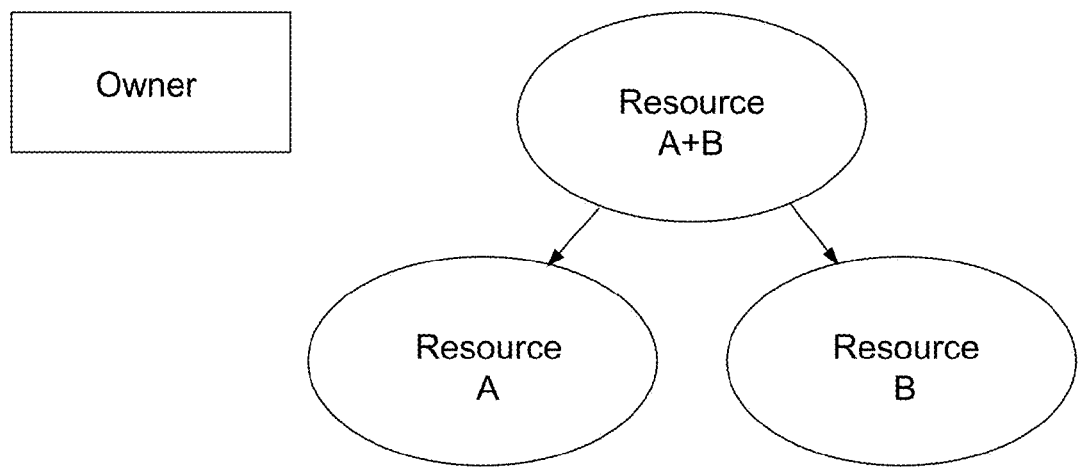
FIGS. 4a and 4b represent a mechanism for synchronizing resources of various types, respectively in functional flowchart form and in pop-up graphical menu form, in several embodiments of the invention.
Figure 4B:
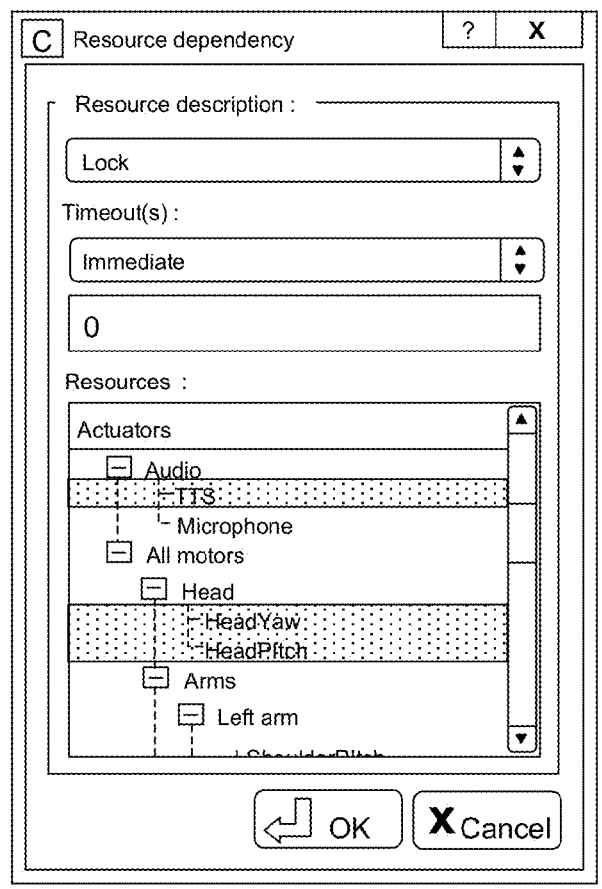

FIGS. 4*a* and 4*b* represent a mechanism for synchronizing resources of various types, respectively in functional flow-chart form and in pop-up graphical menu form, in several embodiments of the invention.

These figures illustrate the case where one and the same Owner (behavior, object) requests several resources which must be available so that it can execute. An Owner may be a Chorégraphe Box but also a C++ object (within the object-oriented sense) which also possesses hierarchical properties.

The object or the behavior is waiting on standby or has previously reserved a resource. When an Owner requests several resources, a new unique resource referencing the sub-resources is created. This new resource allows each resource (a motor for example) and the group of resource (same timeout) to be processed in the same manner. This mechanism, illustrated by the functional flowchart of FIG. 4*a*, makes it possible especially to stop the wait for all the resources if a single one is not available. The method of the invention thus avoids lockups (deadlock).

On the other hand, the following algorithm would not work:

```
seize (List_resources)
    For each resource
        request_and_seize the resource
```

As illustrated in FIG. 4*b*, in Chorégraphe, the selection of several resources is undertaken, thus leading to the calling of the waitResources method (list of resources, owner, callback, timeout) and to the generating of the new unique resource referencing the list of initially selected resources.

Moreover, the list of resources is advantageously ordered so as to avoid certain needless timeouts; in the example illustrated in FIG. 4*b*, in which resource A is audio signal processing (Audio-TTS) and resource B is a pitching motion of the left arm (Arm-Left arm—ShoulderPitch):
Owner 1 (thread1) requests A+B: Owner 1 seizes A and waits for B,
Owner 2 (thread2) requests B+A: Owner 2 seizes B and waits for A.

Without sorting of the resources, no control is dispatched to the robot. With sorting:
Owner 1 (thread1) requests A+B: Owner 1 seizes A, Owner 1 seizes B, thus allowing the execution of the command.
Owner 2 (thread2) requests A+B: Owner 2 waits for A until the timeout, or until the release of the resource A+B by Owner 1.

Figure 5A:
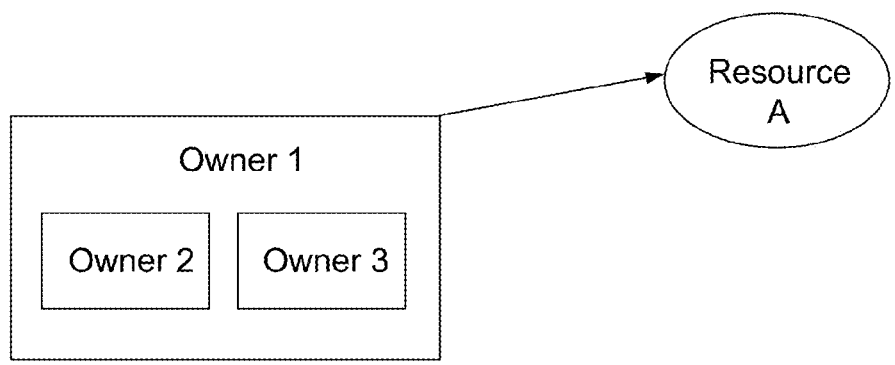
FIGS. 5a and 5b represent a mechanism for reserving critical resources, respectively in functional flowchart form and in pop-up graphical menu form, in several embodiments of the invention.
Figure 5B:
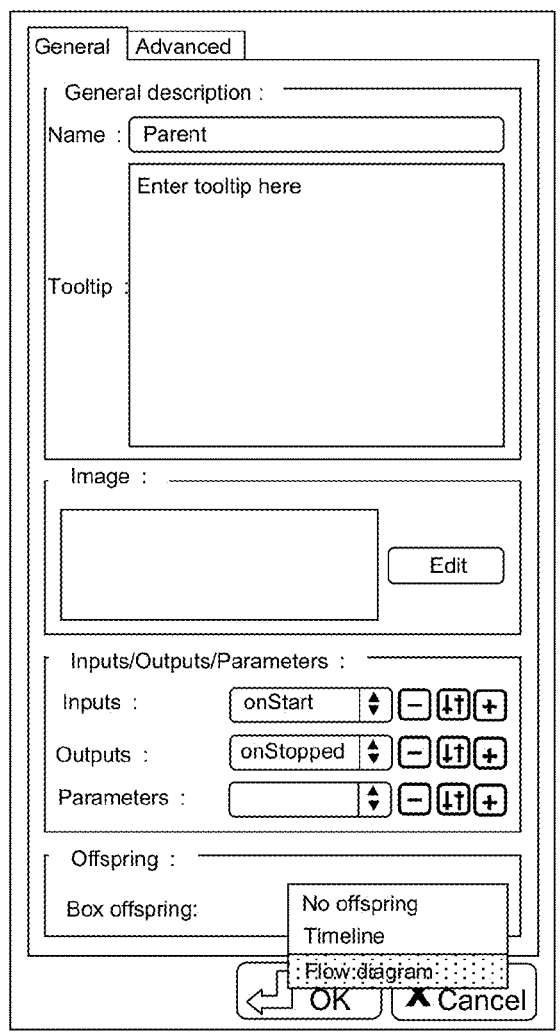

FIGS. 5a and 5b represent a mechanism for reserving critical resources, respectively in functional flowchart form and in pop-up graphical menu form, in several embodiments of the invention.

Certain resources must be available for critical behaviors (recharging of the battery for example). This availability is ensured by an object inheritance of the resources. A parent object or behavior can reserve resources. These resources will then be available for the children, on the other hand, the children will quarrel over these resources.

As illustrated on the functional flowchart of FIG. 5a, Owner 1 does not necessarily use the resources, he occupies them for the child objects or behaviors. The algorithm of the resource manager obliges every child to yield up his resources when he himself releases them. Stated otherwise, resolving a conflict with a child forces resolution of the conflict with the parent also, if the child releases these resources.

Figure 6A:
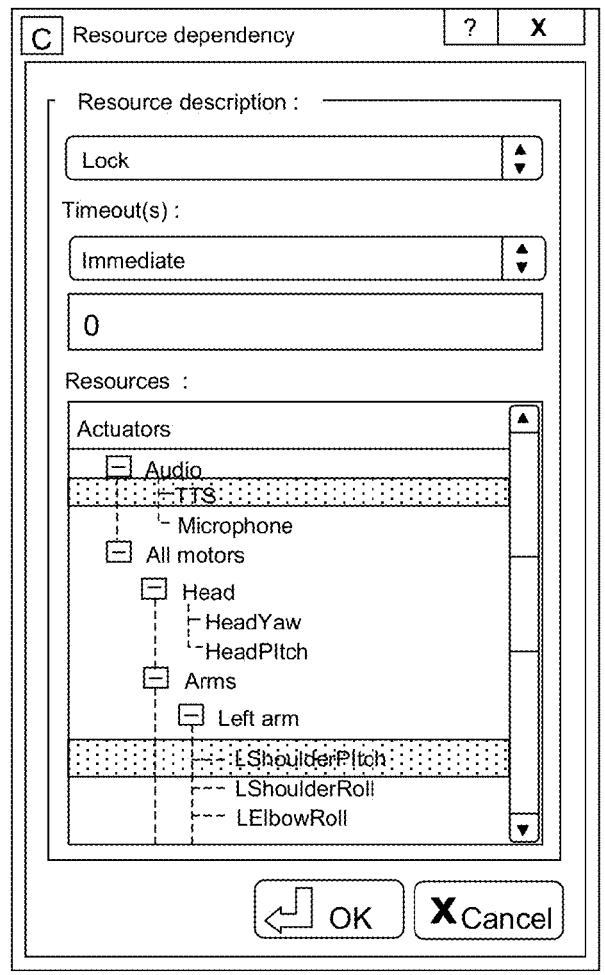
FIGS. 6a and 6b represent an inheritance mechanism of a reservation of resources, respectively in pop-up graphical menu form and in the form of graphical programming based on boxes, in several embodiments of the invention.
Figure 6B:
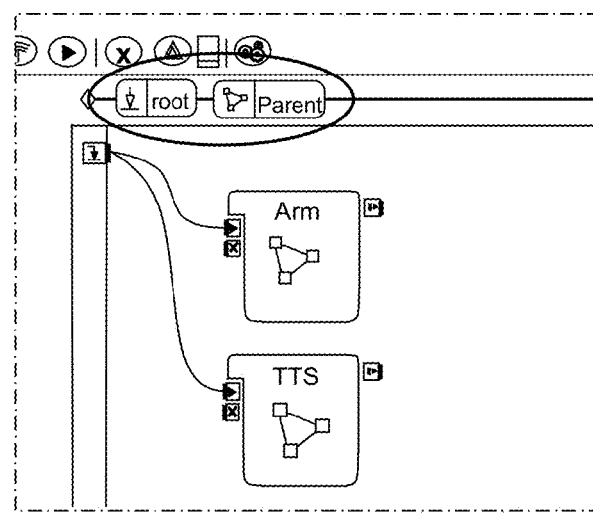

As illustrated in FIG. 5b, in Chorégraphe, a parent Box of flow chart type (hierarchical object for the Resource manager server or Box containing Boxes) is created:

FIGS. 6a and 6b represent an inheritance mechanism for a reservation of resources, respectively in pop-up graphical menu form and in the form of graphical programming based on boxes, in several embodiments of the invention.

In the case of implementation of the invention as illustrated by these two figures, the parent Owner 1 reserves a resource A+B (A=TTS and B=Arms-LeftArm-Shoulder-Pitch).

This composite resource is available to the Boxes (behaviors Owner 2, Owner3) encapsulated in the parent Owner 1 and the first one to request it can use it immediately.

Figure 7A:
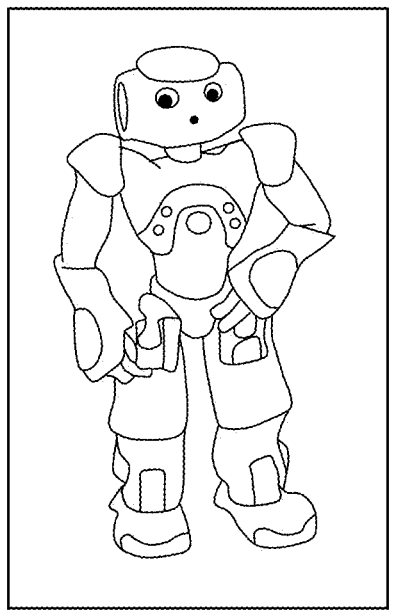
Figure 7B:
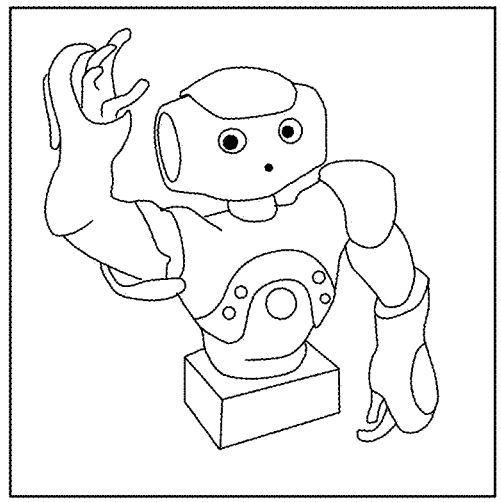

FIGS. 7a, 7b and 7c illustrate the problematic issue of the management of absent resources, respectively by representing a complete robot, a trunk robot and a list of available/unavailable resources, in several embodiments of the invention.

The Resource manager can manage the robot models by freezing the resources which do not exist. In an advantageous mode of the invention, it is thus possible to carry out behaviors independent of the robot model. An enterprise cannot in fact redo the set of behaviors of its clients if the robot changes.

In the case of a robot model having all the parts of a complete robot (all its limbs in particular, such as illustrated in FIG. 7a), the Resource manager recognizes that the robot model is complete and does not implement the resources-freezing mechanism.

In the case of a trunk robot model without legs, such as illustrated in FIG. 7b, after the initialization of the application, we obtain the list of resources represented in FIG. 7c, in which the resources corresponding to the legs absent from the trunk robot model are frozen (i.e. not available for any Owner). They are reserved by a behavior such as LHipYawPitch->ALFrameManager_0x9425af8_root_RobotModel_3 eStrong0 ($1^{st}$ line of the Legs subset of the list of resources of FIG. 7c). This behavior can be described as an artifact or a virtual behavior insofar as it is not intended to be executed.

The same mechanism of total or partial freezing of resources can be applied to manage the faults of certain parts of the robot or prevent them. Let us assume in particular that a motor of the head gets hot, a hotEngine behavior will then occupy the motor by reducing the energy dispatched until the motor cools. Likewise, if an arm breaks, a brokenArm behavior will occupy the broken motor so that no other behavior uses it.

By extension of this concept of management of absent or deficient resources, it is possible to define essential/non-essential resources in respect of a behavior. The availability of the resources declared to be essential in respect of a behavior is imperative for the execution of said behavior. On the other hand, said behavior will be able to be executed despite the unavailability of resources declared to be non-essential. For example, if a behavior is a Greeting normally comprising the combination of a voice message "Hello" (Resource A=Audio), of a gesture of the right arm (Resource B=RightArm) and of two steps forward (Resource C=LeftLeg; Resource D=RightLeg), and if resources A and B are declared essential and resources C and D are declared to be non-essential, the Greeting behavior will be able to be executed even if resources C and D are not available because, for example, the robot is in the process of walking.

If the concept of essential/non-essential resources is used, a behavior for which some resources are defined as non-essential and which are absent or deficient will be able to execute, whereas a behavior for which the same resources are declared essential will not be able to execute. If a behavior calls both upon essential resources and upon non-essential resources, it will execute, as a function of the availability or otherwise of the non-essential resources, in a different manner.

But to obtain to implement the same function, it is also possible to define all the resources as being essential while splitting a behavior into sub-behaviors. By default, the sub-behaviors do not execute if resources are unavailable. Also by default, the global (parent) behavior will always execute. But it is possible to modify the default option at the level of the parent behavior and of the sub-behaviors (or child behaviors) as explained above.

FIGS. 8a to 8e illustrate several schemes for resolving conflicts, respectively in functional flowchart form (8a) and in the form of pop-up graphical menus corresponding to various exit options for a conflict (8b to 8e), in several embodiments of the invention.

Figure 8A:
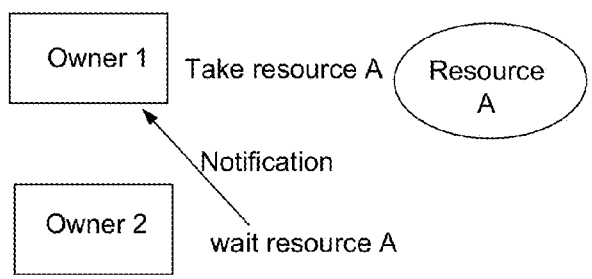
FIGS. 8a to 8e illustrate several schemes for resolving conflicts, respectively in functional flowchart form (8a) and in the form of pop-up graphical menus corresponding to various exit options for a conflict (8b to 8e), in several embodiments of the invention.

As illustrated in FIG. 8a, the multi-agent/distributed approach makes it possible to circumvent complex algorithms that are poorly compatible with real time. The object or the behavior itself resolves the conflict in a local manner. Either it denies the request for resources by the other behavior or behaviors which request them (case illustrated in FIG. 8b). Or it immediately releases the resources so that they can be used by another behavior which requests them (case illustrated in FIG. 8c). Or it executes beforehand a behavior part allowing it to adopt a position of stability before releasing said resources (case illustrated in FIG. 8d; for example, when a movement is in progress, it terminates this movement until the next position of stability). Or the behavior owning the resources pauses itself and releases the requested resources, the pause lasting until the other behavior seizing the resources frees them (case illustrated in FIG. 8e). In all cases in which the resources are not released immediately, the requester behavior adopts a standby position waiting for resources until a timeout whose duration can be predefined. In all cases, deadlock is avoided.

The notification is carried out by a callback system. In C++ or in python: if an owner possesses a resource, it is notified of the request in a callback. In Chorégraphe, the behavior is notified of the request in a callback procedure by providing help to the user by proposing resolution solutions in this callback procedure (whose existence the user does not need to know):

The notification causes stoppage of the behavior which possessed the resource.

The notification does nothing, the behavior which possessed it keeps it.

The notification pauses the behavior which possessed the resource.

The notification calls a function of the user which does what he wants (for example adopt a stable position before releasing the resource).

Figures 8B, 8C:
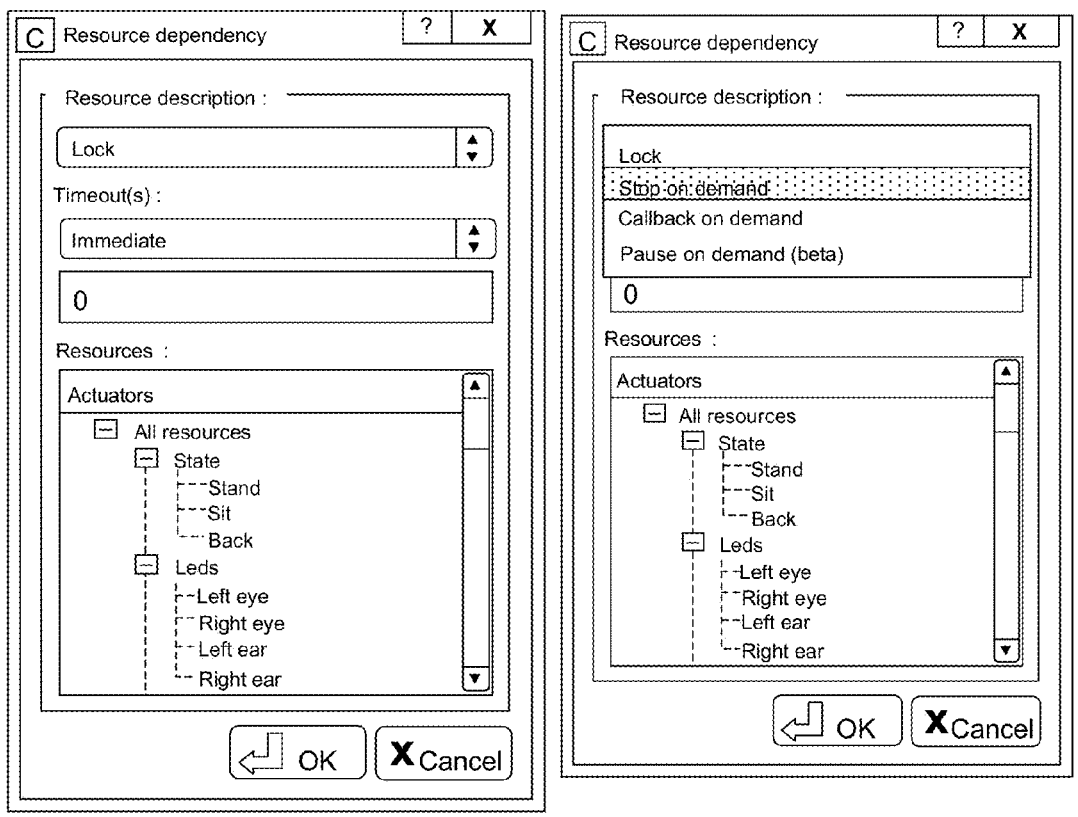
Figure 8D:
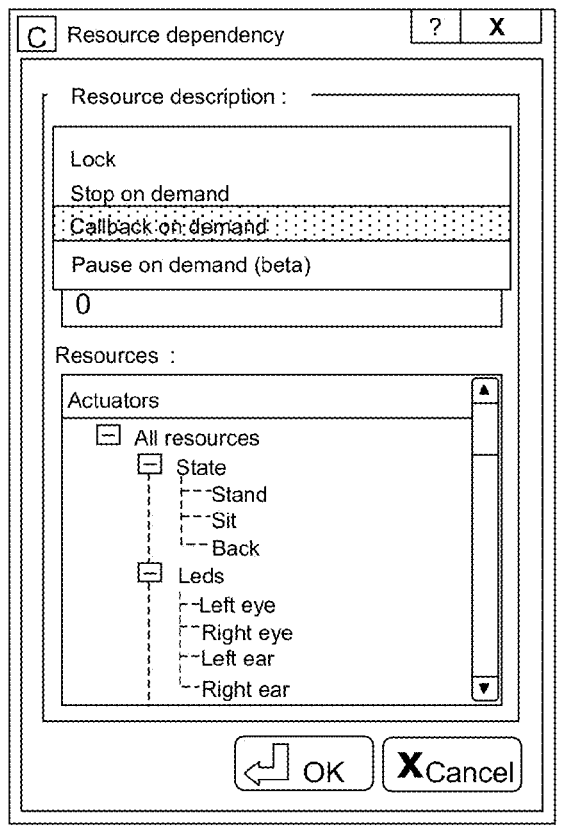
Figure 8E:
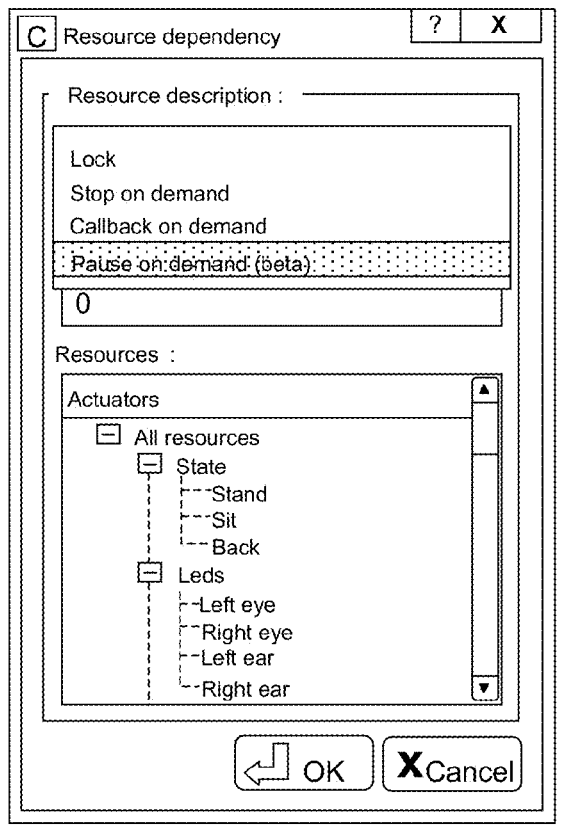

More precisely, in Chorégraphe, the following options are programmable by a user:

Lock: seize the resources without releasing them if they are requested by another behavior (FIG. 8b);

Stop on demand: seize the resources and release them if they are requested (FIG. 8c);

Callback on demand: makes it possible to perform any user code in case of resource conflict; for example in the case of a dance, place the robot in a stable position before stopping the dance and releasing the resources;

Pause on demand: makes it possible to pause a behavior in case of resource conflict and to resume the behavior where it was if the resources are free again.

By default the behaviors keep the resources. Those which are waiting for a resource will therefore wait for the end of the behavior.

Figure 9:
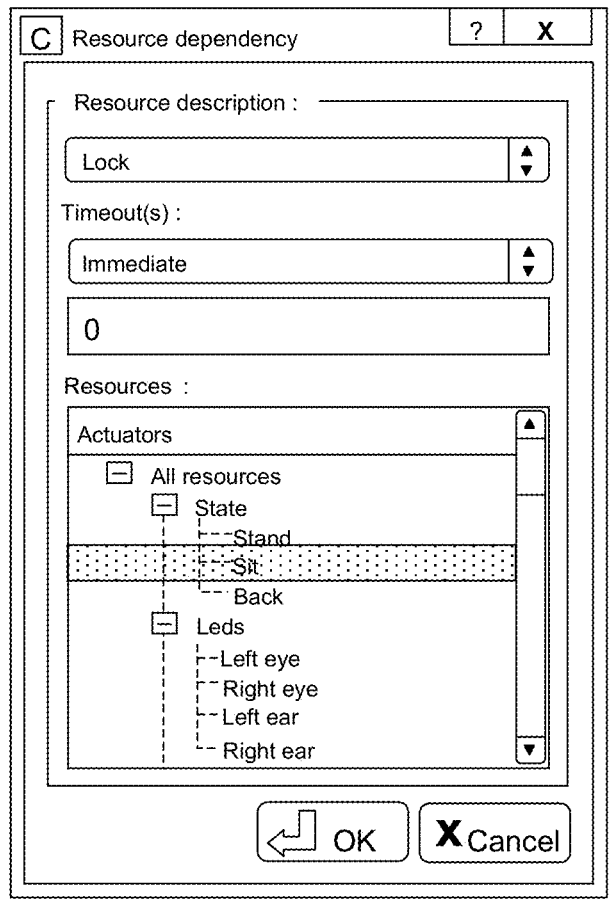
FIG. 9 illustrates the use of the state resources in pop-up graphical menu form, in several embodiments of the invention.

FIG. 9 illustrates the use of the state resources in pop-up graphical menu form, in several embodiments of the invention;

This figure illustrates the use, in embodiments of the invention, of a particular type of resource, dubbed State Resource.

Avoiding conflicts of use of the motors, of the audio, of the video is insufficient to protect a humanoid robot, in particular against risks of falling that could result in faults or breakages. Lower-level protection mechanisms exist, such as the fall management method disclosed by patent application FR/1056798 filed by the applicant. It is however advantageous to be able to prevent falls. For example, cutting the motors while the robot is walking causes the robot to fall. To prevent circumstances of this type, according to the invention, it is possible to define a State Resource whose availability, defined by the activated state of said State Resource, is necessary for the execution of certain behaviors. A State Resource is shared (several objects or behaviors can occupy it). A single state of the resource (the activated state) is available. If the state is not available, the resource responds to the same mechanism described previously (standby waiting for the resource until the timeout and notification of those which occupy the resource. In the case illustrated in FIG. 9, the State Resource is Sit, that is to say the robot must be in a Sit (or Seated) position so that certain behaviors (notably cut all the motors) can be executed. As long as this resource is not available, the behavior "cut all the motors" may not be executed (it is deactivated at the timeout fixed for this behavior).

In Chorégraphe, it is therefore possible to select State Resources. It is possible to generalize the example of FIG. 9 to other states, such as: camera1/camera2 (the robot can be provided with several cameras with different fields, whose use is relevant only in certain positions), plugged in to the mains/not plugged in (certain functions require the use of an energy that is incompatible with the autonomous resources of the robot), etc.

Figure 10:
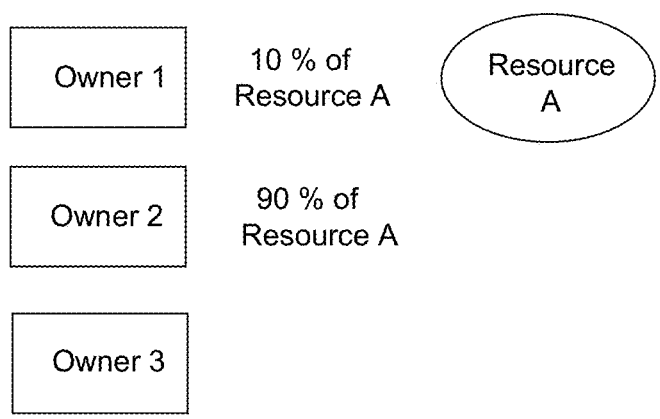
FIG. 10 represents a functional flowchart of the use of a shared accumulative resource, in several embodiments of the invention.

FIG. 10 represents a functional flowchart of the use of a shared accumulative resource, in several embodiments of the invention.

This figure illustrates the use, in embodiments of the invention, of a particular type of resource, dubbed Accumulative Resource.

This type of resource finds application in particular for optimizing the management of the CPU of the robot. The various users cannot launch all the behaviors, they can do so as a function of the availability of the resources (single resource such as a motor), of the position of the robot (State Resource), of the CPU (Accumulative Resource), of the network (Accumulative Resource).

Each behavior declares the share of the CPU that it occupies, this CPU being a shared resource like the resources of State Resource type. However, its use is limited to 100%. In the case illustrated in FIG. 10, Owner 1 declares using 10% of the Accumulative Resource A and Owner 2 declares using 90% of the same Accumulative Resource A. Owner 3 waits for the availability of the Accumulative Resource A until its timeout. Owner 1 and Owner 2 are notified of the request of Owner 3 and can respond to the request with one of the options indicated hereinabove.

The invention can be implemented by combining the various exemplary embodiments represented in the figures and described independently in the description. Thus, several real or virtual behaviors or sub-behaviors can be defined and call in combination upon single resources, State Resources, Accumulative Resources, which can be essential or non-essential resources.

The embodiments of the invention have been described in the case of a single robot. It is, however, possible to generalize the application to cases where several robots, communicating with one another, are induced to share resources. Thus:

If we use the resources of one robot, then any robot (client) of the system can interrogate the resource manager of the other robots (server) to seize a resource;

The robots can also use virtual resources: a ball for example; in this case, a single server robot must reference the ball resource; The other robots (clients) can then seize this resource from the server robot.

An illustrative example of the second case is given hereinbelow:

Robot 1 wants to seize the ball (request to the server robot);

Robot 1 cannot seize the ball (timeout) since another robot possesses the ball resource.

Thus, two robots of the same team do not therefore try to quarrel over the same ball.

The examples described hereinabove are given by way of illustration of embodiments of the invention. They do not in any way limit the field of the invention which is defined by the claims which follow.

The invention claimed is:

1. A humanoid robot configured to execute a plurality of behaviors under the control of an onboard management module comprising:
a sub-module for managing a plurality of resources which can be assigned to the execution of said behaviors, wherein said plurality of behaviors and said plurality of resources are each organized into hierarchical subsets, and said sub-module for managing the resources is configured to reserve one or more resource in at least one subset of resources for the execution of at least one behavior in at least one subset of behaviors, said reservation being inherited by said subset of behaviors and being applied to said subset of resources, wherein said sub-module for managing the plurality of resources is programmed so as, when a subset of resources has at most partial availability, to carry out a reservation of said resources for a virtual behavior defined as a function of said at most partial availability, and wherein said sub-module for managing the plurality of resources is programmed so as to release said reservation as a function of an evolution of the state of said at most partial availability.

2. The humanoid robot of claim 1, wherein said sub-module for managing the plurality of resources is programmed to respond, when a first behavior is being executed, to a resource request by a second behavior with at least one of the following actions: refusing to release said resource to said second behavior, immediately releasing said resource to said second behavior, executing at least one additional action followed by and subsequently releasing said resource to said second behavior, and pausing the first behavior being executed and subsequently releasing said resource to said second behavior.

3. The humanoid robot of claim 2, wherein said sub-module for managing the plurality of resources is programmed so that, when the action of refusing to release said resource required by said second behavior is executed, said second behavior executes a second request to release said resource according to a predefined frequency until expiry of a predefined expiry period.

4. The humanoid robot of claim 1, wherein said sub-module for managing the plurality of resources is programmed so that, when at least two behaviors execute a request to make one and the same resource available, the first of the at least two behaviors has priority in the reservation of said same resource when the latter is released.

5. The humanoid robot of claim 1, wherein said sub-module for managing the plurality of resources is programmed to group at least two resources, when at least one behavior executes a request to make said at least two resources available, into a new resource treated as a single resource, said grouping being arranged in a same order for all the behaviors executing identical resources requests.

6. The humanoid robot of claim 1, wherein said sub-module for managing the plurality of resources is programmed so that, when a parent behavior reserves at least one resource without using it, said at least one resource can be used by a child behavior of said parent behavior.

7. The humanoid robot of claim 6, wherein said sub-module for managing the plurality of resources is programmed so that, when a first child behavior uses a resource reserved by said parent behavior, a second child behavior of the same parent must, so as to be able to use said resource, perform a request to make said resource available with the first child behavior.

8. The humanoid robot of claim 6, wherein said sub-module for managing the plurality of resources is programmed so that, when a parent behavior releases a resource of which it has previously reserved, said resource must be released by any child behavior of said parent.

9. The humanoid robot of claim 1, wherein the plurality of resources comprises at least one state variable, said at least one state variable having to be in a predefined state so as to be reserved, said reservation being necessary for the execution of at least one behavior.

10. The humanoid robot of claim 1, wherein the plurality of resources comprises at least one accumulative resource that includes one or more of a CPU and a network, and wherein use of at least a fraction of said at least one accumulative resource is assigned based on the behaviors programmed to use said at least one accumulative resource.

11. The humanoid robot of claim 1, wherein the plurality of resources comprises at least one essential resource and one non-essential resource, any behavior having to call upon the at least one essential resource being unable to execute if said essential resource is not available and being able to execute if it must call upon said at least one non-essential resource, even if the latter is not available.

12. A method for managing the resources of a humanoid robot able to execute a plurality of behaviors under the control of an onboard management module, said method comprising a step of reservation of a plurality of resources which can be assigned to the execution of said behaviors, wherein said plurality of behaviors and said plurality of resources are each organized into hierarchical subsets, and said reservation step assigns at least one resource in at least one subset of resources to the execution of at least one behavior in at least one subset of behaviors, said reservation being inherited by said subset of behaviors to be applied to said subset of resources, and, wherein when a subset of resources has at most partial availability, said method further comprises carrying out a reservation of said resources for a virtual behavior defined as a function of said at most partial availability, and releasing said reservation of said resources for the virtual behavior as a function of an evolution of the state of said at most partial availability.

13. A non-transitory computer program product comprising program code instructions stored on a humanoid robot to execute a method for managing the resources of said humanoid robot able to execute a plurality of behaviors under the control of an onboard management subroutine, said subroutine comprising a module configured to execute a function for a reservation of a plurality of resources which can be assigned to the execution of said behaviors, wherein said plurality of behaviors and said plurality of resources are each organized into hierarchical subsets and said reservation function assigns at least one resource belonging to at least one subset of resources to the execution of at least one behavior in at least one subset of behaviors, said reservation being inherited by said subset of behaviors and being applied to said subset of resources, and wherein said subroutine is further configured, when a subset of resources has at most partial availability, to execute a function to carry out a reservation of said resources for a virtual behavior defined as a function of said at most partial availability, and to release said reservation of said resources for the virtual behavior as a function of an evolution of the state of said at most partial availability.

14. The computer program of claim 13, wherein said subsets of behaviors and of resources are defined as classes of objects.

15. A method for developing a module for managing the resources of a humanoid robot able to execute a plurality of behaviors under the control of an onboard management subroutine, said subroutine being configured to execute a function for reserving a plurality of resources which can be assigned to the execution of said behaviors, wherein said plurality of behaviors and said plurality of resources are each organized into hierarchical subsets, and in that said reservation function assigns at least one resource in at least one subset of resources to the execution of at least one behavior in at least one subset of behaviors, said reservation function being inherited by said subset of behaviors and being applied to said subset of resources, and wherein said subroutine is further configured, when a subset of resources has at most partial availability, to carry out a reservation of said resources for a virtual behavior defined as a function of said at most partial availability, and to release said reservation of said resources for the virtual behavior as a function of an evolution of the state of said at most partial availability.

16. A non-transitory computer program product comprising program code instructions stored on a humanoid robot configured for allowing, by interaction with a remote module for managing the resources of said humanoid robot configured to execute a plurality of behaviors, a setting of some parameters of an onboard management subroutine aboard said robot, said subroutine comprising a module configured to execute a function for reserving a plurality of resources which can be assigned to the execution of said behaviors, wherein said plurality of behaviors and said plurality of resources are each organized into hierarchical subsets, and said reservation function assigns at least one resource in at least one subset of resources to the execution of at least one behavior in at least one subset of behaviors, said reservation function being inherited by said subset of behaviors and being applied to said subset of resources, and wherein said subroutine is further configured, when a subset of resources has at most partial availability, to carry out a reservation of said resources for a virtual behavior defined as a function of said at most partial availability, and to release said reservation of said resources for the virtual behavior as a function of an evolution of the state of said at most partial availability.

* * * * *